ERECTOR SUPPORT FOR TELESCOPE SIGHTS

Original Filed May 20, 1965 2 Sheets-Sheet 1

William R. Weaver
INVENTOR.

BY R. Weeks
ATTORNEY

ERECTOR SUPPORT FOR TELESCOPE SIGHTS

Original Filed May 20, 1965 2 Sheets-Sheet 2

William R. Weaver
INVENTOR.

BY R. Werle
ATTORNEY

United States Patent Office

Re. 27,222
Reissued Nov. 9, 1971

27,222

ERECTOR SUPPORT FOR TELESCOPE SIGHTS

William R. Weaver, El Paso, Tex., assignor to
W. R. Weaver Company, El Paso, Tex.

Original No. 3,429,634, dated Feb. 25, 1969, Ser. No. 457,438, May 20, 1965. Application for reissue Feb. 16, 1970, Ser. No. 1,993
Int. Cl. G02b *21/00, 23/00, 7/00*
U.S. Cl. 350—54 7 Claims

Matter enclosed in heavy brackets [ ] appears in the original patent but forms no part of this reissue specification; matter printed in italics indicates the additions made by reissue.

ABSTRACT OF THE DISCLOSURE

The present invention pertains to an improved support structure for an erector system in a telescopic firearm sight including a simplified pivot and simplified spring mechanism. The pivot includes an enlarged end on the erector tube (in which the erector lens system is located) for mating with the surface bore wall of the telescope barrel, thereby forming a circular pivot for radially pivoting the erector tube and which allows slidable, longitudinal movement of the erector tube, as well. The spring mechanism radially secures and biases the erector tube with respect to the telescope barrel at a longitudinal position from the pivot, providing a first force component that biases the windage control means and a second force component that biases the elevation control means. Described embodiments of the spring mechanism include a compressible, flat length portion having an end turned inwardly to engage a slot on the erector tube and having its other end stressed against the telescope barrel by a securably releasable connection. One embodiment also includes an arcuate section that partly surrounds the erector tube and contacts the telescope barrel bore at a location more than circumferentially half-way around the bore from the location of the flat length portion.

This invention relates to a telescope sight for firearms, and more particularly to improvements in supports for erector systems of such scopes.

Telescope sights (scopes) for firearms, both of the fixed power and variable power types, employ erector lens systems ordinarily carried on a suitable support means which is pivotally mounted in the scope barrel to have a tilting movement transversely of the scope barrel about the pivot point in response to actuation by means of angularly spaced windage and elevation adjustment means mounted on the exterior of the scope barrel.

Ordinarily the erector support means is in the form of a tubular housing somewhat smaller in diameter than the internal diameter of the scope barrel, and will be pivoted near one end, usually the rearward end, by a pivot means which fixedly secures the erector support means against longitudinal movement in the barrel while permitting swinging or tilting movement of the free portion of the support means. The latter usually will be resiliently biased by various spring means against the inner ends of the windage and elevational screws so as to prevent lost motion or looseness in the structure at all positions. As a result, however, of the longitudinally fixed connection formed by the pivot means between the erector support and the scope barrel, assembly of the scope and adjustment for parallax and other optical adjustments becomes relatively complicated and in some scopes requires changing the location of the pivot means to change the pivot point. The pivoting arrangements are commonly either ball- and socket-type connections or resilient rubber sleeves which are vulcanized, molded, or otherwise fixedly secured to both the erector support and the scope barrel, and thus necessarily involve rather difficult and complex assembly operations and additional adjustment operations to provide the adjustments which may be found necessary after initial assembly of the parts of the scope.

The present invention is directed to an improved erector lens support system for scopes which employs an erector support means having pivoting means which is longitudinally movable in the scope barrel and employing a spring means which accomplishes three important functions: (1) positioning the erector support means in the scope longitudinally thereof; (2) preventing rotation of the erector support means in the scope barrel; and (3) resiliently biasing the free or swinging portion of the erector support means against the windage and elevational adjustment screws to eliminate lost motion or play at all times.

A further object is to provide an erector support means of exceptional structural simplicity and which simplifies greatly the assembly of the erector system in a scope.

A more specific object is the provision of a simple form of spring means forming a longitudinally adjustable biasing connection between the scope barrel and the erector support means.

Other and more specific objects and advantages of this invention will become more readily apparent from the following detailed description when read in conjunction with the accompanying drawing which illustrates several useful embodiments in accordance with this invention.

In the drawing, FIG. 1 is a longitudinal, sectional view of a portion of a more or less conventional riflescope illustrating one embodiment of an erector support system embodying the principal features of this invention;

FIGS. 2, 3 and 4 are cross-sections taken, respectively, along lines 2—2, 3—3 and 4—4 of FIG. 1;

Figure 1:
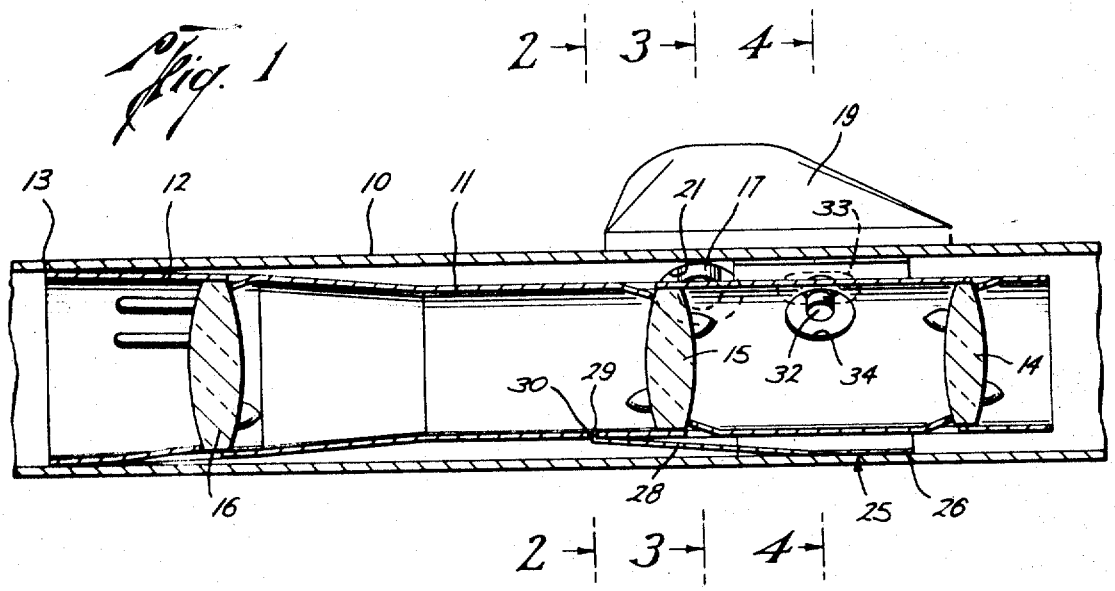
Figure 2:
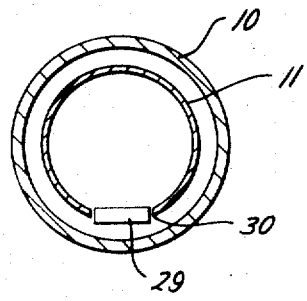
Figure 3:
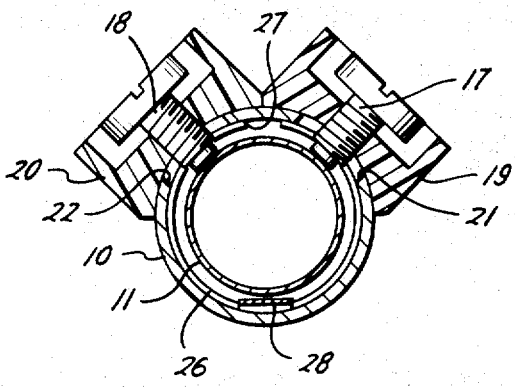
Figure 4:
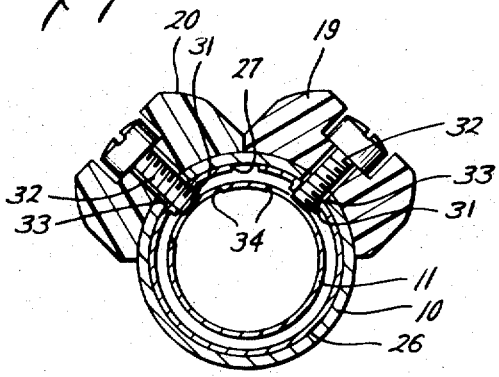
Figure 5:
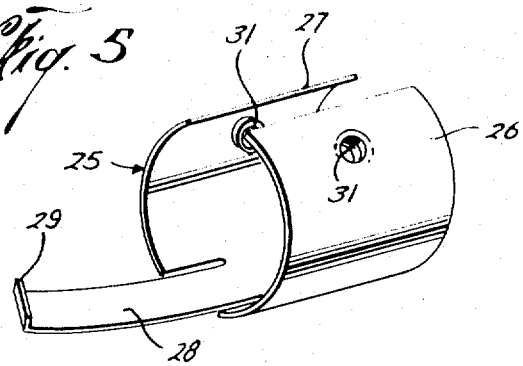
FIG. 5 is a perspective view of one form of biasing spring employed in the erector support system in accordance with this invention.

Referring to the drawing, there is shown the portion of a conventional scope barrel 10 intermediate the ends thereof. It will be understood that a conventional objective lens means will be mounted at the right-hand end of the barrel and a conventional ocular lens means at the left-hand end of the barrel. Neither of these lens elements are shown as their location and general construction will be well understood by those [famiilar] *familiar* with this art.

Longitudinally disposed in the bore of the barrel 10 is an erector lens support tube 11 somewhat smaller in diameter than the internal diameter of barrel 10 and having a conically enlarged or flared end section 12 forming its rearward or left-hand end. The maximum dimension of section 12 is made such that at its terminus it will have an external diameter to form a close fit in the bore of barrel 10 so as to provide a circular pivot point, indicated at 13, about which the support tube may pivot or tilt in response to lateral movement of the opposite end of tube 11. With this form of pivoting arrangement, it will be seen that tube 11 may be moved longitudinally of barrel 10 while maintaining the pivoting connection therewith.

It will be evident that other pivoting arrangements may be employed provided they are longitudinally movable in the scope barrel for a least amount sufficient to encompass the degree of longitudinal adjustment which may be required.

Mounted in the bore of tube 11 is a plurality of suitably ɔaced lenses 14, 15 and 16 which are intended merely ɔ illustrate any suitable form. The particular lens arangement, their number and optical characteristics form o part of this invention, the arrangement shown being ıerely for purposes of illustrating an erector lens sys:m of any conventional form mounted in tube 11. It 'ill be also understood that the erector lens [systems] *ystem* may be one which is suitable for a fixed power :ope or for a variable power scope.

Windage and elevational adjustment screws 17 and 18, espectively, are threaded through suitable housings 19 nd 20, respectively, mounted on the exterior of barrel 0 and positioned so that adjustment screws 17 and 18 re disposed at right angles to each other with their inner nds bearing against the exterior of the free portion of :ector tube 11. Barrel 10 is provided with openings 21 nd 22 substantially larger in diameter than screws 17 nd 18, respectively, to receive the inner ends thereof. It 'ill be understood that by turning adjustment screws 17 r 18 inwardly or outwardly, as required, corresponding ıteral movement of the free end portion of tube 11 will e effected so as to make the necessary windage and eleational adjustments in the erector support system all in :cordance with conventional practice.

A spring structure, designated generally by the numeral 5, constructed in accordance with the embodiment illus:ated in FIGS. 1 to 5, comprises a generally cylindrical ody 26 constructed of sheet metal and which is split ɔngitudinally at 27 whereby to surround the free end ortion of tube 11 in radially spaced relation thereto while tting snugly in the bore of the barrel, and is positioned ı barrel 10 generally opposite housing 19 and 20. Body 6 is formed to provide an integral spring finger 28 ex:nding longitudinally rearwardly from side of the body pposite split 27. The free end of finger 28 is formed to rovide an inwardly turned flange or lip 29 adapted to e received in a correspondingly shaped slot 30 formed ı the wall of tube 11. Body 26 is provided with threaded penings 31—31 on opposite sides of split 27 and adjaent to the edges thereof and are adapted to receive screws 2—32 which extend through housings 19 and 20 in longiıdinally spaced relation to adjustment screws 17 and 8, passing through openings 33—33 in the wall of barrel 0. Openings 33 are made substantially larger in diameter ıan screws [33] *32* so as to provide for clearance thereetween and will preferably be made elliptical having the ɔng axis extending longitudinally of the barrel. By means f the screws 32, it will be seen that body 26 of the spring ıember may be tightly secured to barrel 10. However, if esired to move spring member 25 longitudinally of the :ope barrel, the elongated enlarged openings 33 will perıit such movement to a limited extent upon loosening of :rews 32. Since ordinarily the amount of longitudinal ıovement necessary for the optical adjustments required 'ill be quite small, the enlargements defined by openings 3 need not be very great. Tube 11 will be proved with elatively large diameter holes 34 registering with the ier ends of screws 32, so that movement of tube 11 will ot be interfered with by the inner ends of screws 32.

In assembling the erector system in the scope, spring ɔdy 26 will be placed about the forward end of tube 11 nd lip 29 of spring finger 28 will be hooked into slot 30. his will place openings 31—31 over openings 34 in tube 1. Body 26 will then be compressed sufficiently so that ıbe 11 together with the spring structure may be slipped ıto barrel 10 and moved to a point where threaded openıgs 31—31 will be opposite openings 33. Housings 19 nd 20 will then be placed in the positions shown wherein djustment screws 17 and 18 will project through openings 1 and 22, respectively, into engagement with the outer ırface of tube 11. Screws 32 may then be extended ırough openings [32*a*] in the respective housings and ıence through openings 33 in barrel 10 and screwed into ıpped openings 31. As screws 32 are tightened up, spring body 26 will be drawn tightly against the inner wall of barrel 10 while housings 10 and 20 will be simultaneously pulled tightly down against the exterior of barrel 10, thereby fixing the longitudinal location of spring structure 25 and tube 11 in the barrel 10. By loosening screws 32 slightly, housings 19 and 20 and the entire erector system may be moved longitudinally of barrel 10 to the extent of the clearance provided between screws 32 and the ends of openings 33. The clearance provided by openings 21 and 22 about adjustment screws 17 and 18 will be made sufficient to accommodate the maximum extent of this longitudinal movement.

With tube 11 and spring structure 25 thus located in barrel 10, the pressure of spring finger 28 will be exerted to urge the free end portion of tube 11 against the ends of adjustment screws 17 and 18. Finger 28 will be positioned to apply its pressure generally on a line bisecting the angle between the adjustment screws so as to continuously apply substantially uniform pressure at both points of contact.

While not shown, it will be understood that the pivoted erector system herein described may be employed with the various [recticle] *reticle* arrangements known in the art. In accordance with such known arrangements the [recticle] *reticle* may be mounted in tube 11, either at the forward end in the first image plane or in the rearward portion at the second image plane of the scope. Also, the reticle may be fixedly mounted in scope barrel 10 at the second image plane.

With the arrangement described, it will be seen that spring structure 25 will perform all three desirable functions of longitudinally positioning the erector system; preventing rotation of the erector system; and eliminating looseness between the system and the windage and elevation adjustment screws.

Figure 6:
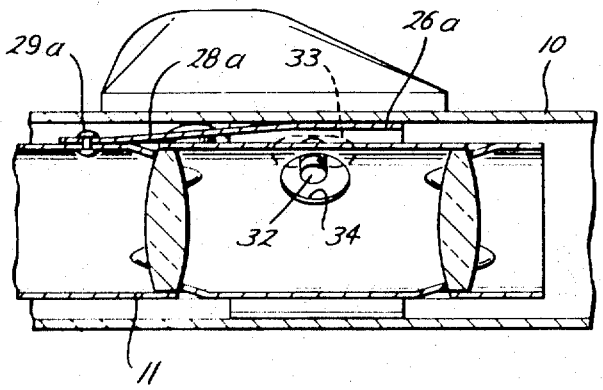
FIG. 6 is a fragmentary, sectional view illustrating a modification of the spring means of FIG. 5.

FIG. 6 illustrates a modification of the spring structure previously described in that spring body 26a is rotated 180°, placing finger 28a on top of tube 11. This finger is secured to tube 11 by means of a rivet 29a and the finger is tensioned to lift or draw the free end of tube 11 against the ends of adjusting screws 17 and 18. The structure thereby functions in the same manner as the previously described embodiment, in that it will fulfill the three functions previously noted.

Figure 7:
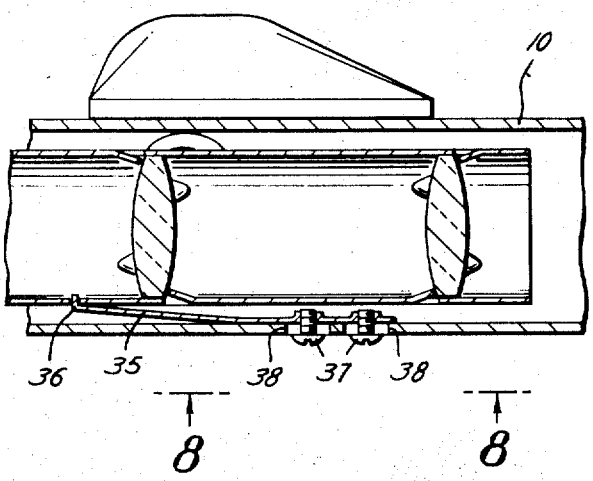
FIG. 7 is a view similar to FIG. 6 illustrating still another form of spring means for the erector support system.
Figure 8:
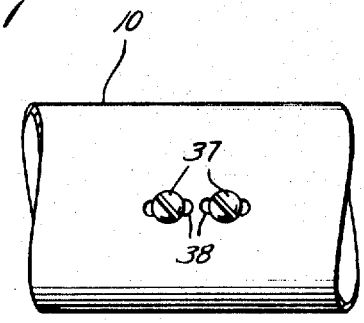
FIG. 8 is a view looking upwardly along line 8—8 of FIG. 7 toward the exterior of the scope barrel.

FIGS. 7 and 8 illustrate still another modification of the spring structure which will perform all of the desirable functions with a longitudinally adjustable erector system of the character herein described. In this modification, the spring structure comprises an elongate flat spring 35 having at one end an upturned lip 36 receivable in slot 30 of tube 11. The opposite end of spring 35 is secured by one or more screws 37 to the wall of barrel 10. Screws 37 pass through openings 38 in the wall of barrel 10, these openings being elongated longitudinally of the barrel to permit the longitudinal adjustment of the erector system as previously described.

It will be evident that the lip 36 may be replaced by a rivet or other suitable means for fastening spring 35 to tube 11 and that spring 35 may be in the form of a length of suitable spring wire rather than the flat leaf form illustrated.

It will be understood that various other modifications and alterations may be made in the details of the illustrative embodiments within the scope of the appended claims but without departing from the spirit of this invention.

I claim:

[1. In an erector support system for telescope sights, comprising:

a sight barrel, an erector support element receivable in the sight barrel for angular movement therein, pivot means between said support element and said sight barrel for allowing the angular movement, windage control means for effecting angular movement of said support element in a first angular direction, elevation control means for effecting angular movement of said support element in a second angular direction, the improvement including:

a spring structure arranged between said support element and said barrel for exerting a radial biasing force to said support element at a point longitudinally spaced from said pivot means, the biasing force having a first force component in said first angular direction and a second force component in said second angular direction, said spring structure including an arcuate body portion stressingly contacting said sight barrel and operably connected to said windage and elevation control means, said body portion having an elongated laterally-urging resilient tongue extending therefrom and in stressing contact with said sight barrel at a point remote from said pivot, whereby said erector support is angularly adjusted.]

[2. In an erector support system as described in claim 1, said support element having a slot in its outer surface, said elongate portion of said spring structure being attachably connected with said support element by having one end which is turned inwardly to engage said slot.]

[3. In an erector support system as described in claim 1, said sight barrel having at least one opening with a longitudinal elongate dimension, said spring structure being releasably securable to said sight barrel through said opening for permitting longitudinal positioning of said spring structure and engaged supported element.].

[4. In an erector support system as described in claim 2, said sight barrel having at least one opening therein, screw means extending through said opening in said barrel for threadably engaging said spring structure, said opening having a substantially larger elongate dimension than the diameter of said screw means for permitting longitudinal positioning of said spring structure and engaged support element.]

[5. In an erector support system for telescope sights as described in claim 1, said pivot including an annular enlargement carried by said support element having a diameter to slidably engage the bore wall of said barrel and shaped to form a circular pivot therewith, said sight barrel having at least one opening with a longitudinal elongate dimension, said support element being releasably securable at a longitudinal distance thereon from said pivot to said sight barrel through said opening for permitting longitudinal positioning of said support element.]

[6. In an erector support system as described in claim 5, said sight barrel having at least one opening therein, screw means extending through said opening in said barrel for threadably engaging said support element, said opening having a substantially larger elongate dimension than the diameter of said screw means for permitting longitudinal positioning of said support element.]

[7. In an erector support system as described in claim 5, said sight barrel having a first opening therein longitudinally in line with said windage control means, said sight barrel having a second opening therein longitudinally in line with said elevation control means, first screw means extending through said first opening in said barrel for threadably engaging said support element, second screw means extending through said second opening in said barrel for threadably engaging said support element, said openings having substantially larger elongate dimensions than the diameter of the said screw means for permitting longitudinal positioning of said support element.]

*8. An erector support system for telescope sights comprising:*

(a) *a sight barrel;*

(b) *erector support means positioned in said sight barrel for angular movement therein;*

(c) *erector lens means mounted in said erector support means;*

(d) *mounting means between said erector support means and said sight barrel for allowing said angular movement, said mounting means providing both a pivoting and axially slidable connection for said support means with respect to said sight barrel sufficient to optically adjust said erector lens means;*

(e) *windage control means for effecting angular movement of said support means in a first angular direction;*

(f) *elevation control means for effecting angular movement of said support element in a second angular direction;*

(g) *a spring structure arranged between said support means and said barrel for exerting a radial biasing force to said support means at a point longitudinally spaced from said mounting means, the biasing force having a first force component in said first angular direction and a second force component in said second angular direction, and said spring structure including a body portion stressingly contacting said sight barrel, said body portion having an elongate laterally-urging resilient tongue extending therefrom and in stressing contact with and secured to said erector support means at a point remote from said mounting means; and*

(h) *adjustment means to secure said body portion of said spring structure to said sight barrel at a plurality of different longitudinal positions whereby said erector support means is longitudinally and angularly adjusted.*

*9. In an erector support system as described in claim 8, said support means having a slot in its outer surface, said elongate portion of said spring structure being attachably connected with said support means by having one end which is turned inwardly to engage said slot.*

*10. In an erector support system as described in claim 9, wherein said adjustment means includes at least one opening in said sight barrel with a longitudinal elongate dimension, said spring structure being releasably securable to said sight barrel through said opening for permitting longitudinal positioning of said spring structure and engaged support means.*

*11. In an erector support system as described in claim 9 wherein said adjustment means includes screw means extending through said slot in said barrel for threadably engaging said spring structure, said slot having a substantially larger elongate dimension than the diameter of said screw means for permitting longitudinal positioning of said spring structure and engaged support means.*

*12. In an erector support system for telescope sights as described in claim 8, said mounting means including an annular enlargement carried by said support means having a diameter to slidably engage the bore wall of said barrel and shaped to form a circular pivot therewith; said adjustment means including at least one opening in said sight barrel with a longitudinal elongate dimension, said support means being releasably securable at a longitudinal distance thereon from said circular pivot to said sight barrel through said opening for permitting longitudinal positioning of said support means.*

*13. In an erector support system as described in claim 12, said adjustment means further including screw means*

*tending through said opening in said barrel for thread-ly engaging said spring structure, said longitudinal elon-ite dimension of said opening being substantially larger an the diameter of said screw means for permitting lon-tudinal positioning of said support means.*

*14. In an erector support system as described in claim 2, said adjustment means including a first opening in id sight barrel longitudinally in line with said windage ontrol means, a second opening in said sight barrel lon-tudinally in line with said elevation control means, first rew means extending through said first opening in said arrel for threadably engaging said spring structure, sec-nd screw means extending through said second open-g in said barrel for threadably engaging said spring ructure, said openings having substantially larger elon-ite dimensions than the diameter of the said screw means r permitting longitudinal positioning of said support eans.*

References Cited

The following references, cited by the Examiner, are of record in the patented file of this patent or the original patent.

UNITED STATES PATENTS

| | | | |
|---|---|---|---|
| 1,950,790 | 3/1934 | Fahrenwald | 33—50.5 |
| 2,610,545 | 9/1952 | Davidson | 350—47 X |
| 2,948,188 | 8/1960 | Kollmorgen | 350—10 |
| 3,184,852 | 5/1965 | Hageman | 350—69 X |
| 3,297,389 | 1/1967 | Gibson | 350—54 X |
| 1,554,939 | 9/1925 | Wollensak | 350—252 |
| 2,355,384 | 8/1944 | Litschert | 350—10 X |
| 2,580,280 | 12/1951 | Bullard | 33—50.5 |

DAVID H. RUBIN, Primary Examiner

U.S. Cl. X.R.

33—50; 350—47, 69, 255